United States Patent [19]

Dean

[11] Patent Number: 4,851,456
[45] Date of Patent: Jul. 25, 1989

[54] TOPCOAT COMPOSITION AND METHOD

[75] Inventor: Doyle E. Dean, Palm Beach Gardens, Fla.

[73] Assignee: Neverwear Corporation, West Palm Beach, Fla.

[21] Appl. No.: 151,814

[22] Filed: Feb. 3, 1988

[51] Int. Cl.[4] .................. C08F 2/44; C08F 6/14; C04B 25/04; C04B 13/24
[52] U.S. Cl. .......................... 523/122; 524/5
[58] Field of Search ............. 524/5; 523/122

[56] References Cited

U.S. PATENT DOCUMENTS

| | | |
|---|---|---|
| 3,977,889 | 8/1976 | Shearing . |
| 4,060,425 | 11/1977 | Harada et al. . |
| 4,153,592 | 5/1979 | Burroway et al. .............. 524/377 |
| 4,172,063 | 10/1979 | O'Brill ............................. 524/5 |
| 4,209,336 | 6/1980 | Previte ............................ 106/90 |
| 4,358,554 | 11/1982 | Yan et al. . |
| 4,430,463 | 2/1984 | Mullenax ........................ 524/5 |
| 4,444,803 | 4/1984 | Winters .......................... 428/467 |
| 4,523,755 | 6/1985 | Turba ............................. 106/97 |
| 4,725,632 | 2/1988 | Vess ................................ 524/5 |

FOREIGN PATENT DOCUMENTS

| | | | |
|---|---|---|---|
| 0115955 | 8/1984 | European Pat. Off. ........ 524/5 |
| 0118637 | 9/1984 | European Pat. Off. ........ 524/5 |
| 562859 | 7/1944 | United Kingdom ........... 524/5 |
| 886141 | 1/1962 | United Kingdom ........... 524/5 |
| 1014544 | 12/1965 | United Kingdom ........... 524/5 |

Primary Examiner—Herbert J. Lilling
Attorney, Agent, or Firm—Steele, Gould & Fried

[57] ABSTRACT

A paste-like topcoat composition for surfaces comprising a dry mix material of sand, cement and a resinous binder. A liquid mix material comprising water, vinyl acrylates and a solvent for at least one of resinous binder and vinyl acrylates and/or methacrylates is mixed with the dry mix material to provide a topcoat composition that is particularly useful for asphalt surfaces. Other ingredients such as defoaming agents, preservatives, and fungicides can be included in the topcoat composition. A method for construction a topcoat is also provided.

20 Claims, No Drawings

//4,851,456//

TOPCOAT COMPOSITION AND METHOD

BACKGROUND OF THE INVENTION

1. Field of the Invention

This invention relates generally to compositions for surfaces, and more particularly to topcoat compositions subject to heavy wear such as asphalt.

2. Description of the Prior Art

Surfaces subjected to heavy wear are difficult and expensive to maintain. Asphalt in particular can suffer severe damage in relatively short periods of time when subjected to heavy traffic. It would be desirable to provide a topcoat composition which could be applied to surfaces such as asphalt that are often subjected to heavy traffic, and which would increase the ability of the surface to withstand wear.

SUMMARY OF THE INVENTION

It is an object of the invention to provide a topcoat composition for surfaces which will resist wearing of the surface even under heavy loads and in high traffic areas.

It is another object of the invention to provide a topcoat composition which is easy to apply.

It is still another object of the invention to provide a paste-like topcoat composition which is particularly adaptable as a surface coating for asphalt.

It is another object of the invention to provide a method for applying a topcoat composition to a surface to improve the wear resistance of the surface.

These and other objects of the invention are accomplished by a topcoat composition comprising dry mix materials and liquid mix materials. The dry mix materials comprise sand, cement, and a resinous binder. The liquid mix materials comprise water, vinyl acrylates, and/or methacrylates, and a solvent for at least one of the vinyl acrylates and resinous binder.

The sand used in the dry mix is preferably silica sand but other similar materials could possibly be used. The cement is preferably a Portland cement, although other cements could potentially be used. The resinous binder preferably is a cellulosic binder and most preferably is a hydroxyalkyl cellulose.

The vinyl acrylates of the liquid mix material preferably comprise water soluble styrene acrylate. The solvent for the vinyl acrylates and resinous binder preferably comprises ethylene glycol butyl ether or diethylene glycol dimethyl ether.

It is desirable to include a defoaming agent in the composition. The defoaming agent preferably is a vegetable oil hydrocarbon product. A preservative and fungicide can also be added to the composition. Phenylmercuric acetate can be used, although other non-mercury compounds can be considered for environmental reasons.

The ratio of sand to cement in the dry mix, by weight, is about 1:1 to about 4:1, preferably about 2:1. Ratios of sand to cement between about 1:1 and about 4:1 are possible. The ratio of water to vinyl acrylate, by volume, is about 1:2 to about 6:1, preferably about 3:1.

A most preferred composition includes a dry mix material comprising about 68 percent silica sand, about 31.8 percent Portland cement, and about 0.2 percent hydroxyethyl cellulose, by weight. The liquid mix material comprises by volume about 24 percent styrene acrylic, about 1.4 percent ethylene glycol butyl ether, and the remainder water. If desired there may be added about 0.2 percent defoaming agent and about 0.1 percent preservatives and fungicides.

A preferred composition according to the invention can be provided by mixing about fifty pounds of the dry mix material with about two gallons of the liquid mix material. The water is preferably added to and mixed with the other components of the liquid mix material with stirring. The dry mix material is preferably then added to the liquid mix with stirring. Standard cement coloring agents can be added to the dry mix material before mixing with the liquid mix material.

DETAILED DESCRIPTION OF THE PREFERRED EMBODIMENTS

According to the invention a paste-like topcoat composition of the invention comprises both dry mix materials and liquid mix materials. The dry mix materials include sand, cement, and at least one resinous binder. The liquid mix materials include water, vinyl acrylates and/or vinyl methacrylates and a solvent for at least one of the acrylates or methacrylates and the resinous binder. It is also possible to include defoaming agents, preservatives and fungicides.

The sand can be of any suitable type. The cement can be selected from a number of suitable cements. Portland cement is a preferred cement.

The resinous binder is preferably a cellulosic binder. A hydroxyalkyl cellulose such as hydroxyethyl cellulose is most preferred.

A vinyl acrylate suitable for use with the invention is water soluble styrene acrylate. A preferred solvent for the vinyl acrylate resin and the resinous binder is diethylene glycol dimethyl ether, ethylene glycol butyl ether, and the like. Other solvents are also possible.

Defoaming agents may be added. Preferred defoaming agents would include vegetable oil hydrocarbon products, although other defoaming agents could be substituted.

A preservative and fungicide can also be included in the topcoat composition of the invention. Phenylmercuric acetate is a preferred preservative and fungicide. This material includes mercury as metal and therefore may not be environmentally acceptable, and other preservatives and fungicides may be substituted.

The preferred ratio of water to vinyl acrylates or methacrylates in the liquid mix material, by volume, is about 3:1. The ratio of water to vinyl acrylate or methacrylates can vary from about 1:2 to about 6:1.

The ratio of sand to cement in the dry mix material, by weight, is preferably about 2:1. The ratio of sand to cement could vary from between about 1:1 and about 4:1.

The ratio of liquid mix material to dry mix material is preferably proportionately about fifty pounds of dry mix material to between one and about three gallons of liquid mix material, and most preferably to about two gallons of liquid mix material. Other ratios are possible.

EXAMPLE

A preferred paste-like composition according to the invention was prepared using the following ingredients:

| | DRY MIX | |
|---|---|---|
| Material | Pounds | Percent |
| Silica Sand (1) | 800 | 67.91 |

-continued

| DRY MIX | | |
|---|---|---|
| Material | Pounds | Percent |
| Portland Cement (2) | 376 | 31.92 |
| Hydroxyethel Cellulose (3) | 2 | .17 |
| | 1178 | 100.00 |

(1) Silica Sand: Gall Silica Mining Company - Type 40F
(2) Portland Cement: any of several manufacturers
(3) Cellulose: Cellosize HEC-QP 4400-M, Union Carbide Corp.

| LIQUID MIX | | | |
|---|---|---|---|
| Material | Pounds | Gallons | Percent |
| 76 RES 1018 (1) | 325 | 37.79 | 24.17 |
| Ektasolve EB (1) | 17 | 2.25 | 1.44 |
| Defoaming Agent (2) | 2 | .23 | .15 |
| Water | 965.5 | 115.90 | 74.13 |
| PMA-30 (2) | 1.5 | .18 | .11 |
| | 1311.0 | 156.35 | 100.00 |

"76 RES 1018" is a trademark of the Union Chemicals Division, Union Oil Company of California
"PMA-30" is a trademark of the Troy Chemical Company, Newark, New Jersey The above ingredients were prepared in batches by first adding the water, with stirring, to the remaining liquid mix materials to reach the percentage compositions indicated in the table above for the liquid mix material. This mixture was poured into a five gallon container. About 50 pounds of the dry mix material was slowly added to the liquid mix with stirring. The stirring was continued for several minutes after all of the dry mix material had been added to the liquid mix material. A standard cement coloring agent, if used, is preferably added to the dry mix material before mixing with the liquid mix material.

The method of applying the composition of the invention begins with the removal of any heavy deposits of oil, grease, dirt or other contaminants on the existing surface. The surface can be cleaned with a strong detergent solution. The composition is preferably applied to the surface using a rubber tipped troweling device. The blade promotes an even distribution of the composition over the surface, even if the surface is damaged, worn, or cracked. A thick nap paint roller can be used to smooth out the lap mark lines and at the same time leave a texture that resembles asphalt.

The sealing can be done in sections overlapping each other so that an entire area does not have to be surfaced at one time. The mixture should be stirred occasionally while in use and especially after interruptions in application. The composition will be workable in the mixing container for up to about one and one-half hours, depending on the precise composition of the mixture, and the prevailing weather conditions such as temperature and humidity. The composition must be used within one and one-half hours and generally cannot be stored in the container for use at a later time.

The composition can be applied to new, relatively smooth surfaces by using only a paint roller. The paint roller should preferably be a ¾ inch nap roller.

The mixture can also be applied by other suitable devices such as spraying. Devices presently in use to spray stucco and drywall finishes can be used to apply the composition of the invention.

The amount of coverage obtained by a quantity of the composition will vary depending on the condition of the surface to be covered and the thickness of the coating that is applied. Cracked, damaged or worn surfaces will generally require more of the composition to cover a surface than would be required to cover an equivalent but smoother surface. The above described mixture of about fifty pounds dry mix and about two gallons liquid mix covered approximately 200–250 square feet to an average depth of approximately 1/16 inch over badly damaged and worn asphalt.

The composition of the invention is particularly useful as a topcoat for asphalt. The composition could also potentially be utilized with other surfaces as a topping, sealer, or covering for concrete surfaces. The composition can be applied over concrete walks and given a slip-resistant finish by roughing or adding an aggregate to the mixture.

This invention can be embodied in other specific forms without departing from the spirit or essential attributes thereof and accordingly, reference should be made to the following claims, rather than to the foregoing specification, as indicating the scope of the invention.

I claim:

1. A topcoat paste for improving the wear resistance of asphalt concrete surfaces, which is cured under atmospheric conditions, comprising the combination of:
    a dry mix material, the dry mix material comprising sand, cement, and a resinous cellulosic binder, the ratio of sand to cement being between about 1:1 and about 4:1, by weight; and,
    a liquid mix material, the liquid mix material comprising water, styrene acrylate monomer, and a solvent for at least one of the styrene acrylate monomer and the resinous binder, the ratio of water to styrene acrylate monomer being between about 1:2 and about 6:1, by volume, the ratio of said dry mix material to said liquid mix material being about 50 pounds of said dry mix material to between about one and about three gallons of said liquid mix material, whereby said composition when applied to a cement or asphalt concrete surface improves the resistance of said surface to cracking, water permeability and chemical degradation.

2. The topcoat paste of claim 1, wherein the ratio of sand to cement is about 2:1, by weight.

3. The topcoat paste of claim 1, wherein the ratio of water to styrene acrylate monomer is about 3:1, by volume.

4. The topcoat paste of claim 1, wherein the ratio of said dry mix material to said liquid mix material is about 50 pounds of said dry mix material to about two gallons of said liquid mix material.

5. The topcoat paste of claim 1, wherein said cement is portland cement.

6. The topcoat paste of claim 1, wherein said cellulosic binder is a hydroxyalkyl cellulose.

7. The topcoat paste of claim 6, wherein said hydroxyalkyl cellulose is hydroxyethyl cellulose.

8. The topcoat paste of claim 1, wherein said solvent for said styrene acrylate monomer and said resinous binder is ethylene glycol butyl ether.

9. The topcoat paste of claim 1, further comprising at least one additive selected from the group consisting of defoaming agents, preservatives, and fungicides.

10. The topcoat past of claim 1, wherein said defoaming agent is a vegetable oil.

11. A topcoat paste composition for improving the wear resistance of asphalt concrete surfaces which is cured under atmospheric conditions, comprising the combination of:

a dry mix material, the dry mix material comprising sand, cement, and a resinous cellulosic binder, the ratio of sand to cement being between about 1:1 and about 4:1, by weight; and, a liquid mix material, the liquid mix material comprising water, at least one of the group consisting of vinyl acrylate monomers and vinyl methacrylate monomers, the ratio of water to said vinyl acrylate monomers and vinyl methacrylate monomers being between about 1:2 and about 6:1, by volume, and a solvent for at least one of the vinyl acrylate monomers and vinyl methacrylate monomers, and said resinous binder, the ratio of said dry mix material to said liquid mix material being about 50 pounds of said dry mix material to between about 1 and about 3 gallons of said liquid mix material, whereby said composition when applied to a cement or asphalt concrete surface and will improves the resistance of said surface to cracking, water permeability and chemical degradation.

12. The topcoat paste composition of claim 11, wherein the ratio of sand to cement is about 2:1, by weight.

13. The topcoat paste composition of claim 11, wherein the ratio of water to said vinyl acrylate monomers and vinyl methacrylate monomers is about 3:1, by volume.

14. The topcoat paste composition of claim 11, wherein the ratio of said dry mix material to said liquid mix material is about 50 pounds of said dry mix material to about two gallons of said liquid mix material.

15. The topcoat paste composition of claim 11, wherein said cement is portland cement.

16. The topcoat paste composition of claim 11, wherein said cellulosic binder is a hydroxyalkyl cellulose.

17. The topcoat composition of claim 16, wherein said hydroxyalkyl cellulose is hydroxyethyl cellulose.

18. The topcoat paste composition of claim 11, wherein said solvent for at least one of said vinyl acrylate monomers and vinyl methacrylate monomers, and said cellulosic binder, is ethylene glycol butyl ether.

19. The topcoat paste composition of claim 11, further comprising at least one additive selected from the group consisting of defoaming agents, preservatives and fungicides.

20. A topcoat paste composition for improving the wear resistance of asphalt concrete surfaces, which is cured under atmospheric conditions, comprising the combination of:

a dry mix material comprising about 67.9% silica sand, about 31.9% portland cement, and about 0.2% hydroxyethyl cellulose by weight; and, a liquid mix material comprising, by volume, about 24.2% styrene acrylate monomer, about 1.4% ethylene glycol butyl ether, and about 74.1% water, the balance consisting of an agent selected from the group consisting of preservatives, fungicides, and defoaming agents.

* * * * *

UNITED STATES PATENT AND TRADEMARK OFFICE
CERTIFICATE OF CORRECTION

PATENT NO. : 4,851,456

DATED : July 25, 1989

INVENTOR(S) : Doyle E. Dean

It is certified that error appears in the above-identified patent and that said Letters Patent is hereby corrected as shown below:

Title page:

In the Abstract, line 10, delete "construction" and insert --constructing--.

Column 3, line 21, after "California" insert --("Unocal 76") for a styrene acrylate copolymer emulsion. "Ektasolve EB" was obtained from Unocal 76, and is a trademark of the Eastman Kodak Co. of Kingsport Tennessee for ethylene glycol butyl ether. Product information for these materials is found in the "76 RES 1018" and "Ethylene glycol butyl ether" (dated 6/2/87) brochures of the Union Chemical Co. The disclosures of these brochures are hereby incorporated by reference.--

Column 3, line 22, after "New Jersey" insert --for a phenylmercuric acetate fungicide. Production information is available from the "Troyson PMA-30" brochure of the Troy Chemical Co. The disclosure of this reference is hereby incorporated by reference.--

Signed and Sealed this

Tenth Day of July, 1990

*Attest:*

HARRY F. MANBECK, JR.

*Attesting Officer*  *Commissioner of Patents and Trademarks*